(No Model.) 6 Sheets—Sheet 1.

W. F. & W. M. WURZBURG & A. A. TLOCZYNSKI.
CASH REGISTER AND INDICATOR.

No. 486,815. Patented Nov. 22, 1892.

Witnesses
Jesse Heller
Philip Masi

Inventors
W. F. Wurzburg
W. M. Wurzburg
A. A. Tloczynski
by E. W. Anderson
their Attorney (No Model.) 6 Sheets—Sheet 2.
W. F. & W. M. WURZBURG & A. A. TLOCZYNSKI.
CASH REGISTER AND INDICATOR.

No. 486,815. Patented Nov. 22, 1892.

Witnesses
Jesse Heller.
Philip O. Masi.

Inventors
W. F. Wurzburg
W. M. Wurzburg
A. A. Tloczynski
by E. W. Anderson
their Attorney

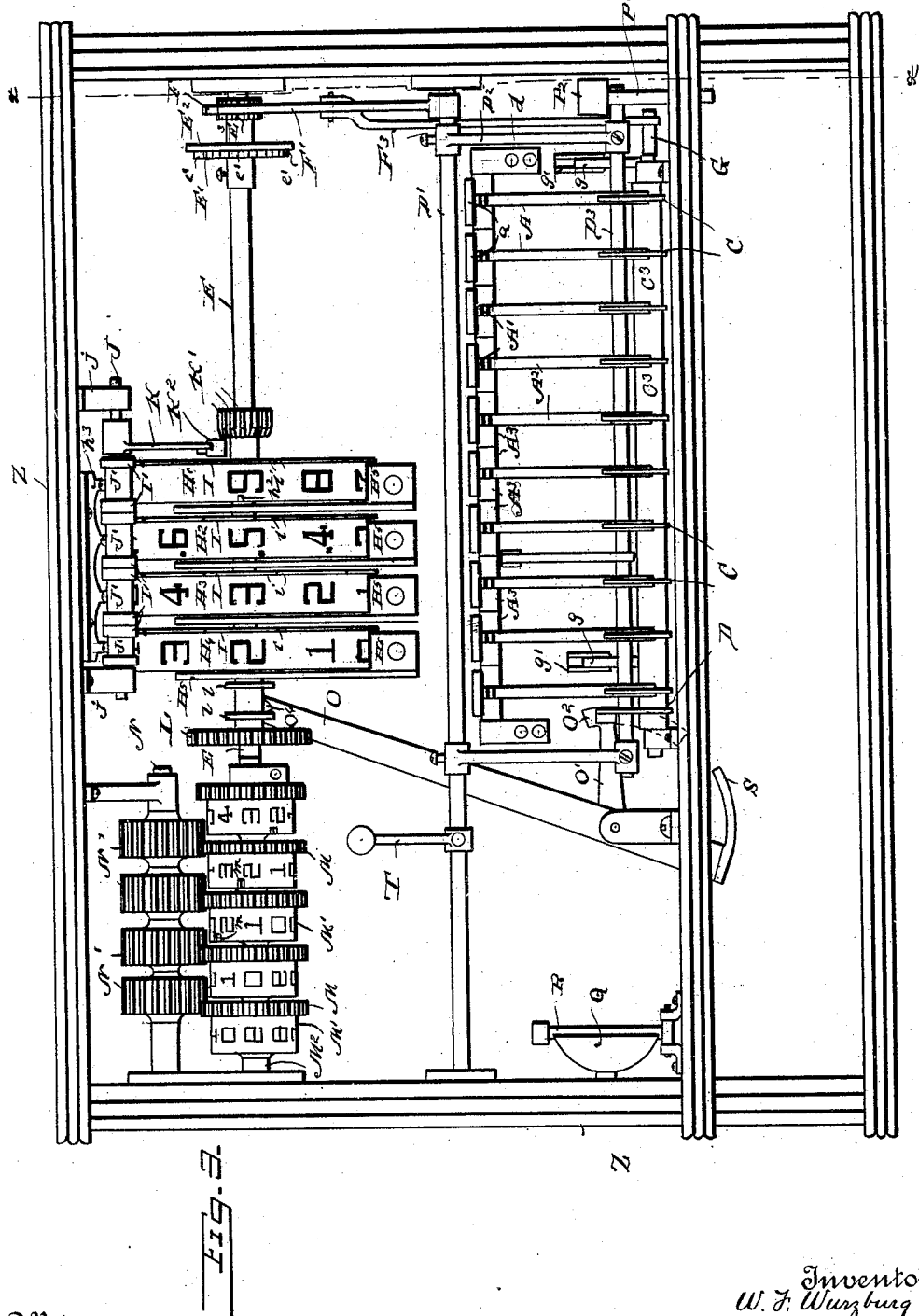

(No Model.) 6 Sheets—Sheet 4.
W. F. & W. M. WURZBURG & A. A. TLOCZYNSKI.
CASH REGISTER AND INDICATOR.
No. 486,815. Patented Nov. 22, 1892.

Witnesses
Jess Heller.
Philip C. Masi.

Inventors
W. F. Wurzburg
W. M. Wurzburg
A. A. Tloczynski
by E. W. Anderson
their Attorney (No Model.) 6 Sheets—Sheet 5.
W. F. & W. M. WURZBURG & A. A. TLOCZYNSKI.
CASH REGISTER AND INDICATOR.
No. 486,815. Patented Nov. 22, 1892.
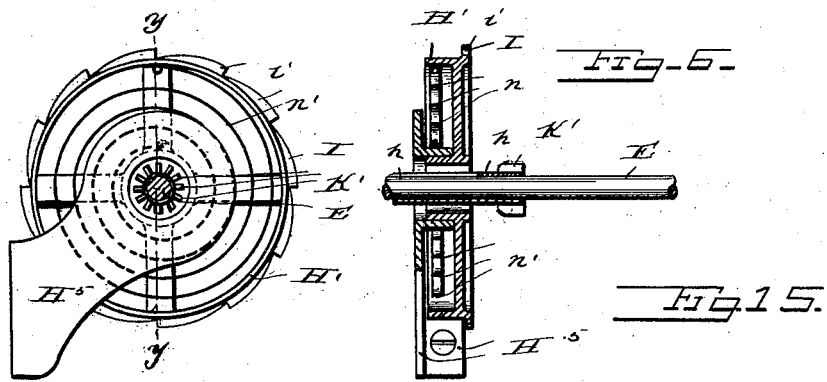
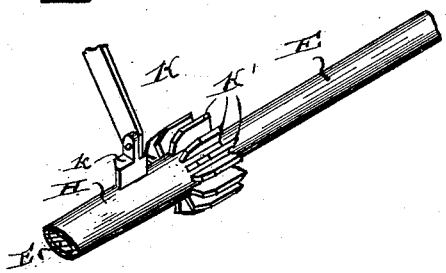
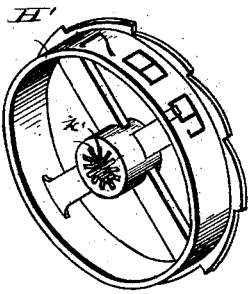
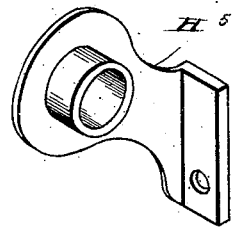
Witnesses
Jesse Heller
Philip O. Mass.
Inventors
W. F. Wurzburg
W. M. Wurzburg
A. A. Tloczynski
by E. W. Anderson
their Attorney

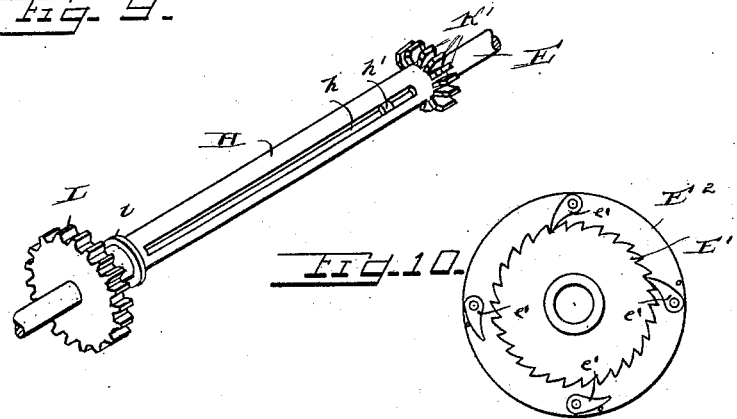

UNITED STATES PATENT OFFICE.

WILLIAM F. WURZBURG, WILLIAM M. WURZBURG, AND APOLLONIUS A. TLOCZYNSKI, OF GRAND RAPIDS, MICHIGAN, ASSIGNORS TO W. F. WURZBURG AND W. M. WURZBURG, OF SAME PLACE.

CASH REGISTER AND INDICATOR.

SPECIFICATION forming part of Letters Patent No. 486,815, dated November 22, 1892.

Application filed May 14, 1892. Serial No. 433,006. (No model.)

*To all whom it may concern:*

Be it known that we, WILLIAM F. WURZBURG, WILLIAM M. WURZBURG, and APOLLONIUS A. TLOCZYNSKI, citizens of the United States, and residents of Grand Rapids, in the county of Kent and State of Michigan, have invented certain new and useful Improvements in Cash Registers and Indicators; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
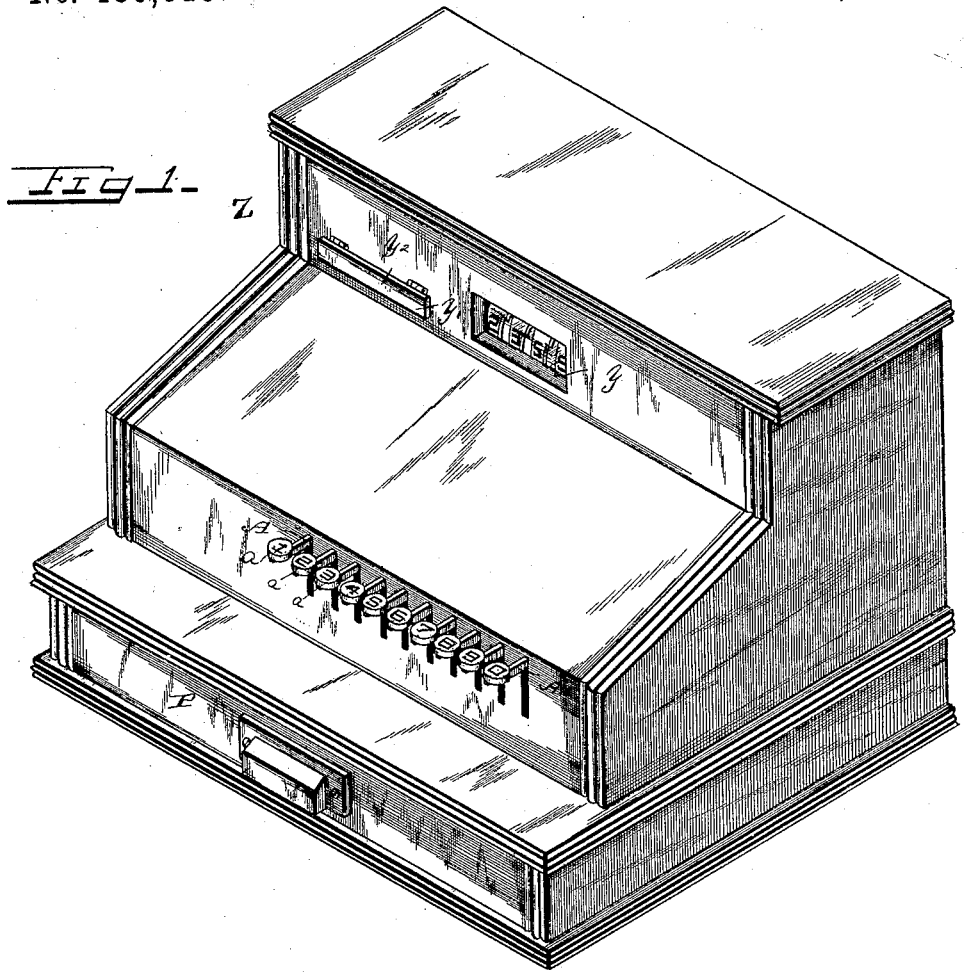
Figure 14:
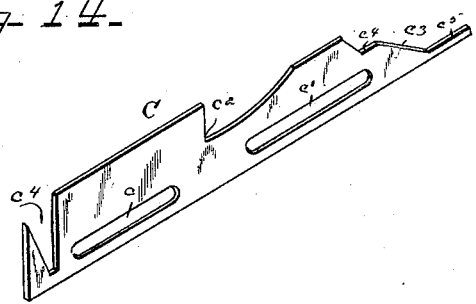
Figure 2:
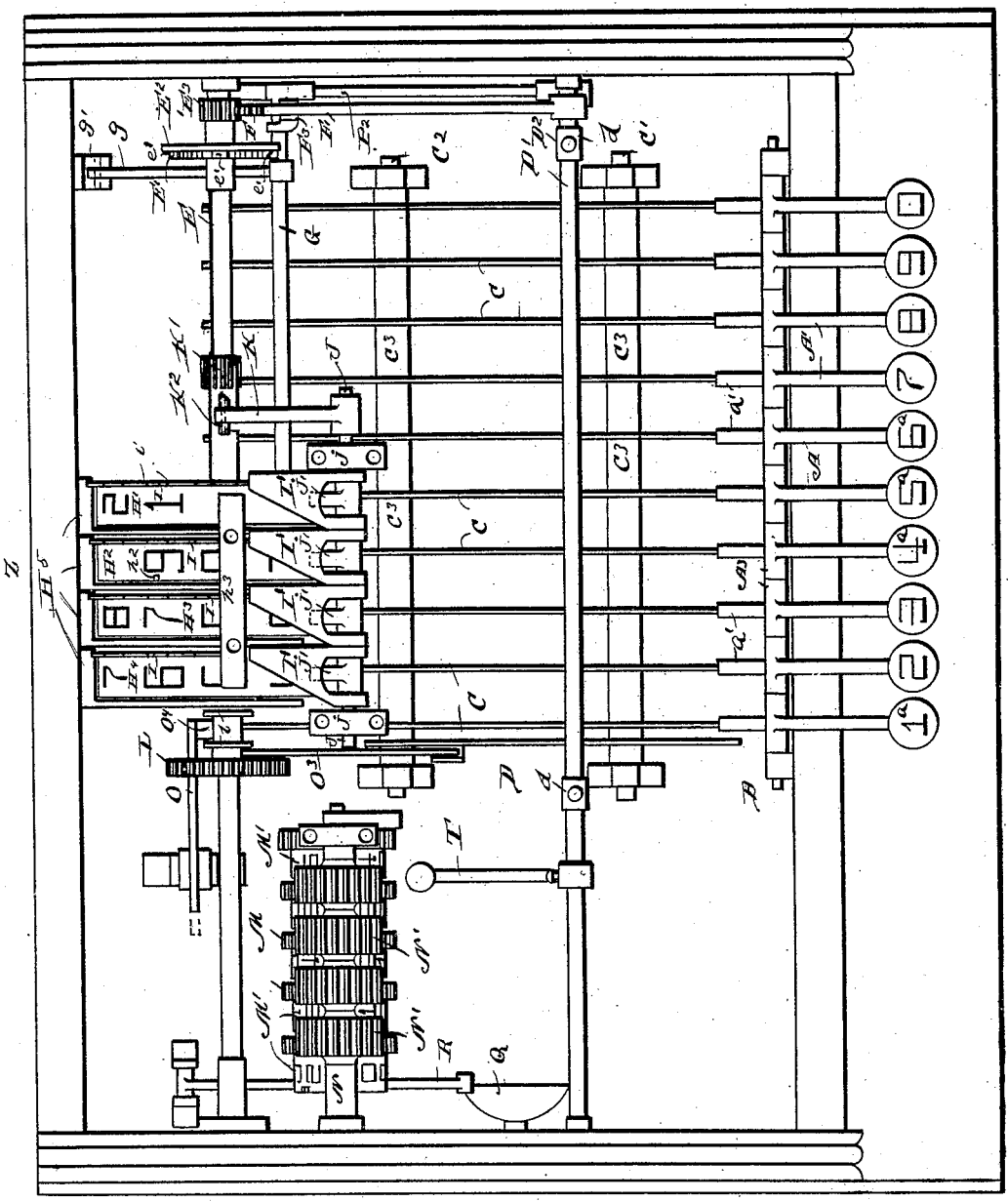

Figure 1 is a perspective view of the machine incased. Fig. 2 is a plan view with the casing removed. Fig. 3 is a front elevation. Fig. 4 is a vertical transverse section on the line $xx$, Fig. 3. Figs. 5, 6, 7, and 8 are detail views of parts of the indicating mechanism. Fig. 9 is a perspective detail view of the sliding sleeve and its shaft. Fig. 10 is a detail view of the ratchet disk and wheel. Fig. 11 is a detail view of the sleeve-operating device. Fig. 12 is a detail view, partly in section, of the indicator-releasing device; and Fig. 13 is a view of the needle-slide. Fig. 14 is a detail perspective view of one of the key-slides. Fig. 15 is a detail view showing the construction of the indicator-releasing mechanism.

This invention has relation to cash registers and indicators, the object being to provide a machine of this character which will be capable by the operation of the proper keys of indicating the amount of each particular sale and at the same time transferring and adding this amount to the sum of the previous transactions, whereby a glance will be sufficient to make apparent the total value of all sales from the time the machine is set until the time of inspection.

A further object is to provide a machine composed of comparatively few parts, so arranged as to be sure in their operation and to obviate the danger of breaking or getting out of order—a difficulty experienced in machines of this character.

In the accompanying drawings the letter A refers to a series of keys, usually ten in number and provided at their upper outer extremities with finger-pieces $a$, said finger-pieces bearing each a numeral, which represents the value of the key. Said numerals in the machine shown consist of the nine digits and zero, arranged in the proper sequence from left to right. It is, however, obvious that other methods of notation may be employed. The keys are each of angular form, having a horizontal arm $A'$, on the extremity of which is the finger-piece $a$, and a vertical depending arm $A^2$, having thereon a projection $a'$ and a shoulder $a^2$. At the angle is an elongated sleeve or bearing $A^3$, which is loosely sleeved on a rod or shaft B, common to the entire series, the keys thereby being each capable of an oscillating or rocking movement on said shaft. The form of the key is clearly shown in Fig. 4. The series of keys are usually arranged a little to one side of the center of the case in order to leave sufficient space for certain operating mechanism, hereinafter to be described.

C C, &c., designate a series of horizontal slides arranged in the lower portion of the inclosing case Z, one slide being provided for each key. Said slides each comprise a plate or bar edgewise disposed and formed at $c\ c'$ with elongated longitudinal slots, which loosely engage, respectively, the rods or bars $C'\ C^2$, on which the slides are designed to have an endwise reciprocating movement. Said slides are held to their proper position by means of collars or sleeves $C^3$ on said shafts $C'\ C^2$ between the slides. At the point $c^2$ each slide is formed with a shoulder, the inner horizontal wall of which is cut on a curve, as shown. On the inner portions of each slide is an incline $c^3$, terminating at each end in a horizontal straight portion $c^4$ and $c^5$. On the outer end of each slide is a notch or slot $C^4$, which receives the lower reduced portion $a^3$ of the key below the shoulder $a^2$. The construction of the slides is clearly shown in Fig. 14, and the purpose and operation of the various parts will be presently described.

D designates an additional slide, which is arranged adjacent to the slide for the "1" key and which is slotted to receive and works on the rods $C'\ C^2$ in a manner similar to the slides C.

D' designates a rock-shaft extending longitudinally throughout the entire length of the case above the slides and provided with suitable bearings at its end portions. Said shaft carries a depending swinging bail from $D^2$, consisting of the depending arms $d$, rigidly secured to said shaft, and a rod or bar $D^3$, connecting and carried by the lower portions of said arms. Said rod or bar $D^3$ normally lies against the shoulders $c^2$ of the slides C C, &c., and in a vertical slot $d'$ in the slide D, as shown in Fig. 13.

E is a second shaft parallel with the shaft D', extending throughout the entire length of the case and provided with loose bearings at $e$ at its ends. On one end portion of said shaft E is rigidly secured a ratchet-wheel E', adjacent to a disk $E^2$, which is loosely sleeved on the shaft and which carries a series of small pawls or ratchet-disks $e'$, which are designed to engage with the teeth of said ratchet-wheel. On the sleeve of said disk is a pinion $E^3$, which is engaged by a toothed segment F on the upper end of an arm or lever F', carried by the shaft D'. To said arm or lever is also connected a depending arm $F^3$, which at its lower end is connected to a rod or shaft G. Said rod or shaft G is carried by swinging arms $g$, hung in brackets or hangers $g'$, secured to the case, and is so placed that it normally rests on the straight horizontal portion $c^5$ on the inner ends of the slides C, as clearly shown in Fig. 4. It will be therefore apparent that when any key is depressed the engagement of the lower portion $a^3$ with the notch or slot $C^4$ will give the respective slide a rearward endwise movement, causing the incline $c^3$ to ride under the rod or shaft G. This action gives a vertical lift or swing to said rod or shaft, causing an upward thrust of the arm $F^3$, thereby operating the segment F and pinion $E^3$, and rotating the shaft E through the engagement of the ratchet-clicks or pawls $e'$ with the ratchet-wheel E'. In order that each slide may operate to rotate said shaft through different arcs corresponding to the values of the respective keys, the inclines $c^3$ are graduated to different degrees of pitch, the incline on the "9" key having the greatest pitch and that on the "1" key the least pitch. The slide for the "0" key will not operate the shaft E for obvious reasons. On the shaft E is an elongated sleeve H, loosely mounted thereon, so as to be capable of a free endwise sliding movement, but rotating therewith. This is effected by means of an elongated slot $h$ in the sleeve, which engages a pin $h'$, fast to the shaft.

Figure 7:
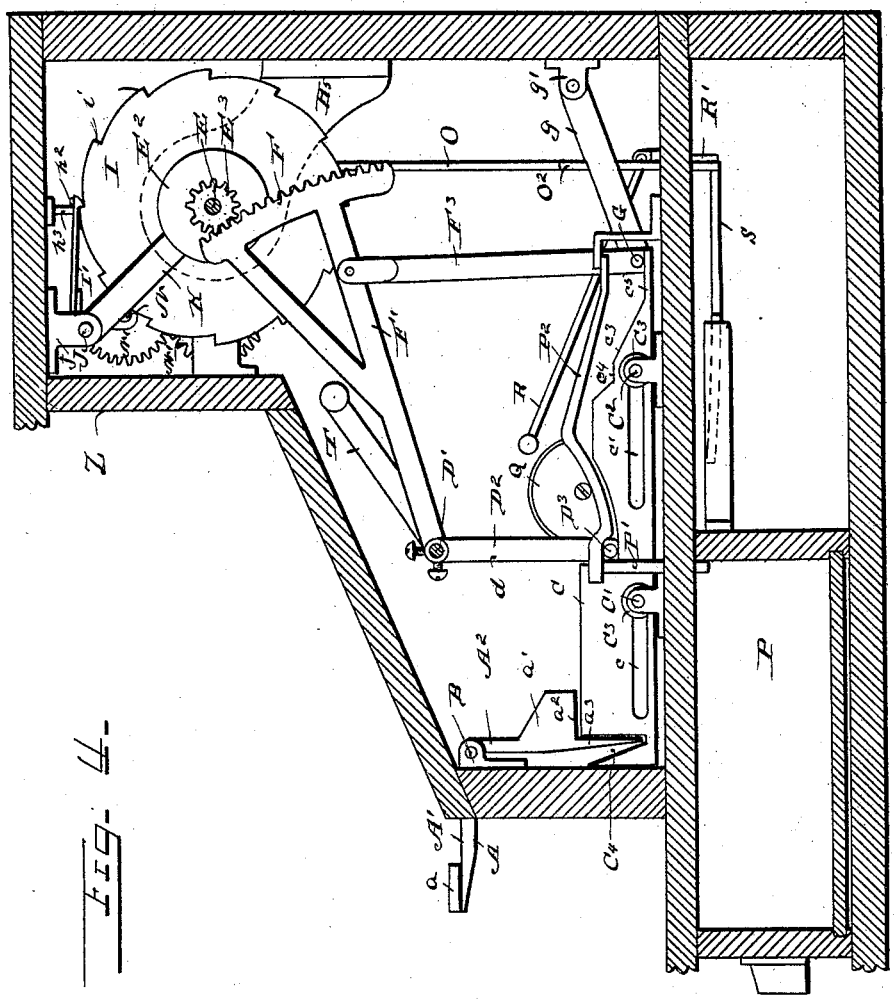

H', $H^2$, $H^3$, and $H^4$ designate the indicator-wheels, four in number, marked each on its periphery with the numbers "1" to "9" and "0." These wheels are held in brackets $H^5$ and are loosely journaled on the sleeve H in such a manner that said sleeve is capable of an endwise movement therethrough. On the periphery of each of said wheels and projecting at right angles thereto is a stop-pin $h^2$, which is engaged by a stop-plate $h^3$ of the frame when the wheels are at their "0" position. Each of said wheels also has fast therewith a ratchet-disk I, having teeth $i$ corresponding in number to the number of spaces on the periphery, and two additional, as shown, or twelve in all. By the provision of these two additional teeth and the blank spaces to correspond on the peripheries of the wheels H' $H^2$, &c., as shown on the wheel H' in Figs. 2 and 3, the said wheels do not have to perform a full revolution, but only a five-sixths revolution, which is preferred. These teeth are engaged to hold the wheels at any desired point, each by one of a series of four pawls I', which are loosely carried by a rock-shaft J, hung in suitable bearings $j$, partly over the wheels. Said shaft J carries, also, four lugs J', upon each one of which one of the pawls I' rests. On one end portion of the shaft is also a depending arm or hanger K, which at its lower end carries a block $K^2$, having in its under side a groove $k$, one end of which is chisel-shaped. The said block is connected to the arm or hanger in such a manner that when moved in one direction it will exert a lift against said hanger, but when moved oppositely thereto will merely swing to one side. The construction is best shown in Figs. 3, 12, and 15. This block is designed to be engaged by any one of a series of twelve projections K', of shape similar to said groove, on the end of the sleeve H, as hereinafter described. When said sleeve is moved forwardly, that one of the projections K' which happens to be in the proper position will enter and pass through the groove $k$, thereby moving the block $K^2$ in such a manner as to cause it to lift on the arm K, as above described. When, however, said sleeve is moved backwardly, the projection K', owing to its shape, cannot enter the groove $k$, and the whole block is moved to the opposite side and permits the projection to pass it. The journal portion of each of the indicator-wheels H', &c., is formed with a series of internal radial slots $k'$, as shown in Fig. 7, any one of which is designed to be engaged by a projection K' when the sleeve H is given a sufficient endwise movement, and thereby effect a rigid connection between the wheel and the shaft E', so that as said sleeve is rotated the wheel will be carried therewith. On the end of the sleeve opposite the projections K' is a gear-wheel L and collars $l\ l$ back of said gear-wheel. This gear-wheel L upon a sufficient endwise movement of the sleeve is designed to be brought into engagement with any one of a series of gear-wheels M, each one of which is fast to one of a series of total-adding wheels M', journaled loosely and independently upon a short shaft $M^2$. Said shaft $M^2$ is supported in bearings of the frame parallel with the shaft $D^2$ and to one side thereof. Each of said wheels M' is marked around its periphery with the numbers "1" to "9" and "0," inclusive, and each attached gear-wheel M has thereon twenty teeth, or two for each number on the adding wheels. Above the shaft $M^2$ is a second short shaft N, parallel therewith, and on which is loosely journaled a series of carrying-pinions N'. These carrying-pinions are one less in number than the adding-wheels, the first pinion being in engagement with the gear-wheel M of the second adding-wheel, the second pinion with the gear of the third adding-wheel, and so on. Each pinion is also designed to be engaged by a stud or projection $m$ on the periphery of the preceding adding-wheel when the latter has registered its full capacity, whereby the excess of registration is transferred to the next adding-wheel of the series through the carrying-pinion and the gear of the succeeding wheel. In order to effect the endwise movement of the sleeve H to bring the indicator-wheel into connection with the shaft E and the gear-wheel L thereon into engagement with the gear of the adding-wheels, we provide the devices now to be described.

O designates an arm or lever pivoted at its lower portion in a bracket in the lower portion of the machine. Said lever at about the point where it is pivoted has a laterally-projecting arm O', on the extremity of which is a vertical segment-arm $O^2$, having therein a series of perforations $o\ o$, all as clearly shown in Fig. 11. On the end of the extra slide D is a rearwardly-projecting needle $O^3$, having a point $o'$. When any key is operated, the endwise movement of its slide C (the shoulder $c^2$ is in engagement with the swinging bar $D^3$, as hereinbefore described) will swing the rod or bar $D^3$, which movement by reason of the fact that said rod or bar lies in the slot $d'$ of the slide D will give an endwise thrust to said slide and its needle. The said needle is so located that upon this movement its point will enter one of the perforations $o$, oscillating or swinging the lever O. The upper end of this lever has a projection $O^4$, which engages the sleeve H between the two collars $l\ l$ thereon. The holes or apertures in the arm $O^2$ of said lever O are somewhat elongated and are so arranged that when the point $o'$ of the needle, which is bent downwardly, engages with any one thereof in its forward movement it takes a bearing against the upper wall of the aperture and the lever is rocked sufficiently to bring the aperture in the plane of the straight portion of the needle. Upon the reverse movement of the needle, however, the point is withdrawn through the aperture $o$ without taking a sufficient bearing on the lower arm thereof to cause the lever to be rocked in the opposite direction, and the said lever consequently retains the position which it attained by the forward thrust of the needle. The oscillation of said lever will therefore give said sleeve an endwise movement on the shaft E for the purpose of bringing the indicating and adding wheels into gear, as above described. This endwise movement of the sleeve primarily brings one of the projections K' thereon into engagement with the block $K^2$ of the hanger-arm K of the shaft I. This engagement rocks said arm and shaft sufficiently to cause the lugs J' to raise the pawls I' from engagement with the indicator-wheels, which then return to and are stopped at their "0" position, obliterating the indication of the previous transaction. This return is effected by means of springs $n$, one end of each of which is secured to one of the indicator-wheels and at the other end to the bracket $H^5$.

P designates the cash-drawer in the lower portion of the case and normally locked by means of a sliding bolt P'. Connected to said bolt is an arm $P^2$, which is engaged by the swinging rod or bar $D^3$ of the bail-frame $D^2$ in such a manner that when any key is operated the movement of its slide will by its action through the bail-bar and said arm withdraw the bolt and release the drawer.

Q designates a bell carried by the frame of the machine and operated by an oscillating hammer R, which has a projection or trip R' extended into position where it will be engaged by the drawer when the latter is pulled out. This engagement operates the hammer R to sound the bell. In order to return the sleeve H to its original position after a sale has been indicated and recorded, the lever O is provided with a depending curved arm or extension S, projecting through into the lower portion of the case in such position that when the drawer is closed said drawer or a plate or projection thereon will engage said arm, thereby operating the lever O to give the sleeve H a reverse endwise movement to its original position, ready for the next operation. Upon this movement of the sleeve the projections K' thereon will pass through the internal radial slots $k'$ of the indicator-wheels without engagement therewith. When said projection K' reaches the block $K^2$ of the hanger-arm, owing to the partial chisel shape of the projection and of the slot $k'$, as hereinbefore described, the arm K will throw said block to one side, allowing said projection to pass by it without operating it to release the indicator-wheels from their indicating position, said block then swinging back to place.

T is a weighted arm on the rock-shaft D' for the purpose of returning said shaft, the segment-carrying arm F', the pinion $E^3$, the bail-frame $D^2$, and thereby the slide C, to their original positions.

In order to describe the detailed operation of the machine, we will suppose that a sale amounting to twenty-three dollars and fifty-nine cents has been made, which amount it is desired to indicate and register. In this connection it may be stated that the wheels H' $H^2$ are the cents-indicating wheels, and the wheels $H^3$ $H^4$ the dollar-indicating wheels. The "9" key is first struck with the finger, causing its slide C an endwise sliding movement, moving the bail-frame $D^2$ sufficiently to cause the needle-slide and needle to be moved, so that the point of the needle will enter the first perforation or hole $o$ in the segmental arm $O^2$ of the lever O.

Said lever O is thereby operated, moving the sleeve H endwise on its shaft, the projection K' operating to release the indicators, which are then returned to their "0" position, where they are stopped and held, as before described. Said projection K' then enters into engagement with one of the slots $k^2$ in the first cents-indicator wheel H', and thereby effects a rigid connection between the said wheel and the shaft E. At the same time the first total-adding wheel is brought into gear and the lock-bolt of the drawer is released. At this time the incline $c^3$ of the slide commences to act upon the swinging shaft G, thereby raising the arm $F^3$ and operating the toothed segment F and pinion $E^3$, the shaft E, the indicator-wheel H', and the gear of the first adding-wheel, which is in engagement with the gear-wheel L. The pitch of the incline $c^3$ of this slide is such that the wheel H' will be rotated to bring the "9" to indicating position, where the wheel is held by its pawl, and the gear of the first adding-wheel will be rotated through an arc occupied by eighteen teeth, or sufficient to register "9," it being remembered that two teeth are usually employed for each number. This completes the operation of this key, and the shaft G then rests on the horizontal portion $c^4$ of the slide.

During the operation of this key the weight-arm T of the rock-shaft D' has been raised, and immediately upon the release of said key said arm will bring the shaft back to its original position, and by means of the bail-frame $D^2$ will also carry the slide back to its original position, at the same time returning the needle-slide and withdrawing the needle from engagement with the perforation o, leaving the lever or arm O in the position to which it was thrown by the forward thrust of the needle, as hereinbefore described. Said needle-point is then in position to engage the second perforation o upon the operation of the next key. During the back movement of the key and slide the shaft E, sleeve H, and ratchet-wheel E' remain stationary; but the disk $E^2$ and pinion $E^3$ are carried back by the weight of the arm F, arm $F^3$, and shaft G, which return to their original position. The "5" key is next depressed, its operation being the same as that of the "9" key, with the exception that the device for releasing the indicator-wheels is not operated. The needle-point enters the second perforation o, operating the lever O to give the sleeve H a further endwise movement. This withdraws the projection K' of the sleeve from engagement with the first cents-wheel H and brings it into engagement with the second cents-wheel $H^2$. The gear-wheel L is carried out of engagement with the gear of the first adding-wheel and into engagement with the gear of the second adding-wheel. The complete operation of the key brings the wheel $H^2$ to position to indicate "5," which amount is registered on the second or tens-of-cent adding-wheel. The "5" key is then released and the "3" key struck.

The needle then enters the third perforation o, the projection K' is carried into engagement with the first dollar-indicator wheel, and the gear-wheel L into engagement with the gear of the third adding-wheel, the "3" being indicated and recorded. The "2" key is then struck, carrying the projection K' into engagement with the fourth or tens-of-dollar adding-wheel and the gear-wheel L into engagement with the gear of the fourth adding-wheel, and the "2" is registered and recorded. This completes the registration, and as each indicator-wheel when operated is caught and held by its pawl the total amount "$23.59" is indicated. The cash-drawer is then pulled out, which sounds the bell. When the drawer is closed, the lever O is operated thereby in the manner heretofore described to return the sleeve H to its original position, leaving the indicators in position until released by the registration of a subsequent sale.

It will be observed that while the "0" key will not operate the indicating and recording wheels, its slide will operate the needle-bar and needle, the lever O, and the sleeve H, so that if it is desired to register five dollars the "0" key is twice struck, which will bring the adding and indicating wheels into proper gear for indicating and recording the "5" on the proper wheels when the key is depressed.

The case Z may be of suitable ornamental form, having a sight-slot at Y through which the indicators are observed, also a slot at Y' for the inspection of the adding-wheels, said slot being protected by a hinged plate or cover $Y^2$.

Having described this invention, what we claim, and desire to secure by Letters Patent, is—

1. In a cash register and indicator, the combination, with a series of rocking keys, a series of slides, one for each key and operated thereby, a swinging bar or shaft operated by said slides, and adding and indicating mechanisms operated by the movement of said slides, of an additional slide operated by the operation of any one of said series of slides and mechanism operated thereby for throwing the indicating and adding mechanisms into gear, substantially as specified.

2. In a cash register and indicator, the combination, with the keys, of the slides operated thereby, the swinging shaft or bar operated by any one of said slides, the indicating and adding mechanisms operated from said shaft, the needle-slide and needle operated by all of said series of slides, and the device operated by said needle for throwing the adding and indicating mechanisms into proper gear, substantially as specified.

3. In a cash register and indicator, the combination, with the shaft E and its operating mechanism, of the elongated sleeve capable of an endwise movement along said shaft but rotating therewith, the indicating-wheels journaled around said sleeve and shaft, a series of projections carried by said sleeve and designed to have engagement internally with any one of said indicator-wheels but with but one of said wheels at a time, the holding-pawls for said wheels, the pawl-releasing devices operated by said projections on the sleeve, the adding devices actuated by a gear-wheel on said sleeve, and means for imparting a step-by-step endwise movement to said sleeve through the operation of the keys, substantially as specified.

4. In a cash register and indicator, the combination, with the shaft E, rotated by the operation of the keys and the sleeve on said shaft and having an endwise movement thereon, of the indicating-wheels arranged to have connection one at a time with said sleeve, the stop-bar, the holding-pawls, the rock-shaft carrying said pawls, and devices operated by the initial movement of said sleeve to release said pawls, as specified.

5. In a cash register and indicator, the combination, with the shaft E and its operating mechanism and the sleeve rotating with and sliding on said shaft, said sleeve having a lug or projection, of the indicator-wheels loosely journaled in brackets around said sleeve, and a series of radial internal slots in each of said wheels, designed to be engaged by said projection, the holding and releasing devices for said indicators, the lever in engagement with said sleeve, the needle-slide actuated by each key, and the needle carried by said needle-slide and operating said lever, substantially as specified.

6. In a cash register and indicator, the combination, with the shaft E, its operating mechanism, the sliding sleeve H on said shaft and rotating therewith, and the lug or projection on said sleeve, of the indicator-wheels loosely journaled in brackets around said shaft, said wheels having the internal radial slots designed to be engaged by said lug or projection, the stop-bar, the holding-pawls, the shaft on which said pawls are loosely carried, the lifting-lugs for said pawls, and the hanger-arm carried by said shaft and operated by said lug or projection to lift said pawls, substantially as specified.

7. In a cash register and indicator, the combination of the shaft E, sleeve H, sliding thereon and rotating therewith, projection K' on said sleeve, indicators H' H² H³ H⁴, having internal slots for engagement with said projection, the stop-bar, the rock-shaft, its pawls for holding the indicators, and the releasing devices operated by said projection, substantially as specified.

8. In a cash register and indicator, the combination of the shaft E, the sleeve H thereon, the operating devices for said sleeve, the lug or projection K' on one end portion of said sleeve, the gear-wheel L on the other end portion, the rotary indicators having internal slots designed to be engaged by the lug or projection K', the stop, holding, and releasing devices therefor, and the adding mechanism operated by a connection with the gear-wheel L, substantially as specified.

9. In a cash register and indicator, the combination of the rotary indicators having the numbers "1" to "9" and "0," inclusive, marked on their peripheries, the stop-pins on said peripheries, their ratchet-gear, the stop-bar therefor, the rock-shaft, the pawls loosely carried thereby and designed to engage said ratchet-gear, the lugs on said shaft, upon which said pawls rest, the rocking device for said shaft, the operating-shaft E, and means whereby any one of said indicators may be made fast with said shaft E upon the operation of the proper key, substantially as specified.

10. In a cash register and indicator, the combination, with the adding and indicating mechanisms, of the sliding sleeve designed to have engagement with said adding and indicating mechanisms, the shaft carrying said sleeve and its operating mechanism, the lever in engagement with said sleeve, the needle, the slide carrying said needle and operated by the depression of any key to move said sleeve in one direction, and a cash-drawer operating the lever device to move said sleeve in the reverse direction, substantially as specified.

11. In a cash register and indicator, the combination, with the loose rotating indicators, the stop, releasing, and holding devices, and the adding-wheels and their gear, of the shaft E and its operating devices, the sleeve H, having an endwise-sliding movement on said shaft and rotating therewith, means on said sleeve for engagement with the indicators and with the gear of the adding-wheels upon its endwise movement in one direction, the lever in engagement with said sleeve, the needle operating said lever, the needle-slide carrying said needle and actuated by the depression of any key to move said sleeve in one direction, and a cash-drawer operating against said lever for returning said sleeve, substantially as specified.

12. In a cash register and indicator, the combination, with the adding and indicating mechanisms, the sliding sleeve operating said mechanisms, the shaft carrying said sleeve, and the key-operated slides operating said shaft through intermediate gear, of the needle-slide operated by any one of the keys, the needle carried by said slide, and the lever in engagement with said sleeve and operated by said needle, substantially as specified.

13. In a cash register and indicator, the combination, with the shaft E, of the sleeve H, rotating therewith and having an endwise-sliding movement thereon, the projection K' on said sleeve, the series of rotary indicators normally loose on said sleeve and turning in brackets, their returning-springs, the internal radial slots in said indicators, designed to be engaged by said projection, the ratchet-gear on each indicator, the loose pawls for said gear, the rock-shaft carrying lifters for said pawls, and the hanger carried by said shaft and operated by said projection, substantially as specified.

14. In a cash register and indicator, the combination, with the rocking keys and the slides operated by said keys, of the needle-slide operated by any one of said slides, the needle carried thereby, the lever O, the perforated segment-arm carried by said lever, the arm on said lever, projecting into the lower portion of the case, and the cash-drawer operating said arm, substantially as specified.

15. In a cash register and indicator, the combination, with a series of angular keys loosely pivoted at their angles, of a series of reciprocating slides operated each by its key, a swinging rod or shaft operated by said slides and a different vertical distance by each, and a weighted swinging-bail frame engaged and operated by each slide and serving, also, to return said slides after operation, substantially as specified.

16. In a cash register and indicator, the combination, with a series of angular rocking keys, of a horizontal reciprocating slide for each key, operated by the impingement of the key, the swinging rod or shaft G, operated by said slides, each slide operating it a different vertical distance, the swinging-bail frame operated by all of said slides, the needle-slide and needle operated by said bail-frame, and the lever for throwing the adding and indicating mechanisms into gear, said lever being operated by said needle, substantially as specified.

17. In a cash register and indicator, the combination of a series of angular rocking keys, their horizontal reciprocating slides, the gear operated by said slides, the rock-shaft D', its swinging-bail frame carried by said shaft and operated by said slides, the needle-slide and needle operated by said bail-frame, and the cash-drawer having a lock-bolt released by a connection with said bail-frame, substantially as specified.

18. In a cash register and indicator, the combination, with the series of keys, of the series of reciprocating slides operated one by each key, the rock-shaft D', the bail-frame carried by said shaft and operated by said slides, the needle-slide, the needle operated by said bail-frame, and the weighted arm carried by said rock-shaft for returning the bail-frame, needle-slide, and key-slides to their normal position, substantially as specified.

19. In a cash register and indicator, the combination, with the series of pivoted rocking keys, of a reciprocating slide operated by each key, a swinging-bail frame operated by each slide, a needle-slide and needle operated by said bail-frame, a cash-drawer having its lock released by the action of said bail-frame, and means for returning said slides and bail-frames to their original position when a key is released, substantially as specified.

20. In a cash register and indicator, the combination, with a series of angular rocking keys carrying finger-pieces on their horizontal arms, of a series of reciprocating slides having each a notch at its outer end engaged by the depending arm of its respective key, the additional slide, the guides on which said slides work, the shoulder $c^4$ on each key, the bail-frame operated by engagement with said shoulder, the graduated inclines, and the adding and indicating mechanisms operated by said slides, substantially as specified.

21. In a cash register and indicator, the combination, with a series of angular rocking keys, of a series of edgewise-disposed reciprocating slides operated each by one of said keys, said slides having each a notch receiving the lower end of its respective key, a shoulder for engagement with a bail-frame, and an incline by means of which the adding and indicating gear is operated, said inclines being of different pitch on the different slides, substantially as specified.

22. The combination, with a series of rocking keys, of a series of edgewise-disposed reciprocating slides, one for each key and operated thereby, the guide rods or bars working in slots in said slides, the collars or sleeves on said rods or bars, the shoulder $c^2$ on said slides, the graduated inclines $c^3$, the horizontal portions $c^4$ and $c^5$, terminating said inclines, and the adding and indicating mechanisms operated by said slides, substantially as specified.

23. In a cash register and indicator, the combination, with the keys and their slides, of the needle-slide operated by the operation of any one of said keys and slides, the needle carried thereby, the lever O, having a perforated segment-arm designed to be engaged by said needle, the sliding sleeve for throwing the adding and indicating mechanisms into gear, operated by said lever, and the arm on said lever, operated by the closing of the cash-drawer for reversely operating said sleeve, substantially as specified.

24. In a cash-register and indicator, the combination, with the keys, their slides, the needle-bar, needle, lever devices, and swinging rod or shaft G, all operated by said slides, of the rock-shaft D', its weighted arm, the segment-carrying arm F', and toothed segment F, carried by said shaft, the shaft E, having gear operated by said segment, the arm $F^3$, connected to said segment-carrying arm and to the rod or shaft G, and the adding and indicating mechanisms operated from the shaft E, substantially as specified.

25. In a cash register and indicator, the combination, with the adding and indicating mechanisms, of the shaft E, the sleeve H, sliding on and moving with said shaft, said sleeve having means for connection with the gear of the adding and indicating mechanisms, the swinging rod or shaft G, operated by the key-slides, the arm $F^3$, toothed segment F, the pinion $E^3$ on said shaft and engaged by said segment, the ratchet-wheel E', fast to the shaft E, and the disk E², loosely sleeved on said shaft and having a pawl connection with said ratchet-wheel, substantially as specified.

26. In a cash register and indicator, the combination of keys A, slides C, swinging frame or shaft G, needle-slide D and its needle, the lever O, operated by said needle, the shaft D', its weighted arm, and bail-frame D², the segment-carrying arm F' and toothed segment F, the arm F³, connecting said swinging rod or shaft and the segment-carrying arm, and the adding and indicating mechanisms operated from said segment and lever O, substantially as specified.

27. A cash register and indicator comprising the keys A, key-slides C, swinging rod or shaft G, bail-frame D², shaft D', arm F', toothed segment F, arm F³, shaft E, its gear operated by said segment, the sleeve H, the indicators H' H² H³ H⁴ and their gear and operating devices, the adding mechanism and its gear operated from said sleeve, the needle-slide D and its needle, and the lever O, having a connection with said sleeve and operated by said needle, all in combination with an inclosing case having a cash-drawer the lock of which is released by the bail-frame D², said cash-drawer having means whereby it sounds an alarm when opened and operates the lever O in one direction when closed, substantially as specified.

In testimony whereof we affix our signatures in presence of two witnesses.

WILLIAM F. WURZBURG.
WILLIAM M. WURZBURG.
APOLLONIUS A. TLOCZYNSKI.

Witnesses:
GERSTROM POWERS,
P. G. FITCH.